(12) United States Patent
Yang

(10) Patent No.: US 7,409,968 B2
(45) Date of Patent: Aug. 12, 2008

(54) FAUCET WITH A WATER OUTLET CONTROLLED BY A CENTRAL PULL STICK

(76) Inventor: Tsai-Chen Yang, 235 Chung-Ho Box 8-24, Taipei (TW)

( * ) Notice: Subject to any disclaimer, the term of this patent is extended or adjusted under 35 U.S.C. 154(b) by 104 days.

(21) Appl. No.: 11/586,703

(22) Filed: Oct. 26, 2006

(65) Prior Publication Data

US 2008/0099089 A1  May 1, 2008

(51) Int. Cl.
*E03C 1/04* (2006.01)
(52) U.S. Cl. .............................. 137/801; 4/678; 239/588
(58) Field of Classification Search ................. 137/801; 4/678; 239/588
See application file for complete search history.

(56) References Cited

U.S. PATENT DOCUMENTS

| | | | | | |
|---|---|---|---|---|---|
| 1,728,492 | A | * | 9/1929 | Kaufman | 4/695 |
| 2,173,064 | A | * | 9/1939 | Judell | 4/676 |
| 4,463,460 | A | * | 8/1984 | Arnold et al. | 4/678 |
| 4,874,006 | A | * | 10/1989 | Iqbal | 137/119.05 |
| 4,997,008 | A | * | 3/1991 | Zbin | 137/801 |
| 5,845,670 | A | * | 12/1998 | Life | 137/119.05 |
| 6,035,458 | A | * | 3/2000 | Tarzia | 4/443 |
| 6,195,818 | B1 | * | 3/2001 | Rodstein et al. | 4/678 |
| 6,668,393 | B1 | * | 12/2003 | Mascari et al. | 4/678 |
| 7,082,626 | B2 | * | 8/2006 | Williams et al. | 4/570 |
| 7,313,834 | B2 | * | 1/2008 | Tan et al. | 4/678 |

\* cited by examiner

*Primary Examiner*—John Fox

(57) ABSTRACT

A faucet with a water outlet controlled by a central pull stick capable of being installed easily comprises a valve body consisting of a main body and a head portion connected together by screw threads. The valve body further comprises a main body and a head portion connected to the main body by a screwing mechanism. A stopper on the main body and a retaining part on the head portion are coupled together upon the screwing so that the retaining part will be fixed on an attached object after the valve body penetrated through the object. Thereby, idle rotation between the head portion and the main body can be prevented. Further, the valve body can be locked onto the attached object by screws applied through the upper surface of the object, facilitating quick installation of the valve body.

7 Claims, 6 Drawing Sheets

US 7,409,968 B2

FAUCET WITH A WATER OUTLET CONTROLLED BY A CENTRAL PULL STICK

FIELD OF THE INVENTION

The present invention relates to faucets, more particularly to a faucet with a water outlet controlled by a central pull stick capable of being installed.

BACKGROUND OF THE INVENTION

A faucet of the prior art connected to a bath tub or a toilet basin has the structure shown in FIG. 6. The faucet comprises a valve body having outer screw threads and consisting of a head portion and a main body that are different parts on an integral body. The bottom end of the main body is extended with a valve tube shrinking toward the connection port of a shower head. The installation of the faucet onto a bath tub or a basin is done by the engagement with a clipping part underneath the attached surface. A water outlet is mounted on the valve body, and a water divider is seal with in the valve body for controlling the water direction.

However, because of the expanded portion of the valve tube of the faucet, the faucet should be inserted into the installation hole on the attached material from below, special installation tools and a variety, of faucets corresponding to bath tubs of different styles are necessary.

Further, the faucet of the prior art has a water outlet for a shower head; but, due to that the valve body is an integral part of the faucet, a water divider controlling the outward direction of water will be disposed within the valve body by a special tool and from above, which is a difficult and therefore time-consuming process.

Further, the installation of the faucet of the prior art to a bath tub needs a single hand extending to a tight space under the surface of installation, which is difficult to apply force and to attain required precision. If the space is too tight, a special tool is needed to assist the applying hand. Therefore, such a tedious assembling process needs to be improved.

SUMMARY OF THE INVENTION

The primary objective of the present invention is to provide a faucet with a water outlet controlled by a central pull stick that can be easily assembled.

The secondary objective of the present invention is to provide a faucet with a water outlet controlled by a central pull stick that can be mounted directly on a base material by a screwing means.

It is another objective of the present invention wherein a water divider can be easily installed.

To achieve above object, the present invention provides a faucet with a water outlet controlled by a central pull stick, comprising: a valve body having a main body and a head portion connected to a top end of said main body by a screwing mechanism, said main body for penetrating an attached material further comprising a threaded outer wall that at least includes a lateral retaining face, a clipping part and a retaining flange housing said clipping part underneath, a top surface of said retaining flange being further provided with a support ring supporting against a bottom surface of said attached material, an inner rim around said retaining flange being further provided with a plurality of inner retaining faces, said main body further comprising a bottom multi-way tube; a water outlet mounted on to a top end of said head portion of said valve body having a water exit part connected with an axial hole within said valve body; and a water divider coaxially housed in said axial hole within said valve body further including a resilient element, said water divider further comprising a valve tube and being coupled with a pull stick axially going through said water outlet, whereby an upward/downward motion of said pull stick will activate an opening/closing of both of said axial hole within said valve body and a vertical axial hole of said multi-way tube, and whereby the direction of an inward water flow will be selected.

DETAILED DESCRIPTION OF THE PREFERRED EMBODIMENTS

The various objects and advantages of the present invention will be more readily understood from the following detailed description when read in conjunction with the appended drawings.

Figure 1:
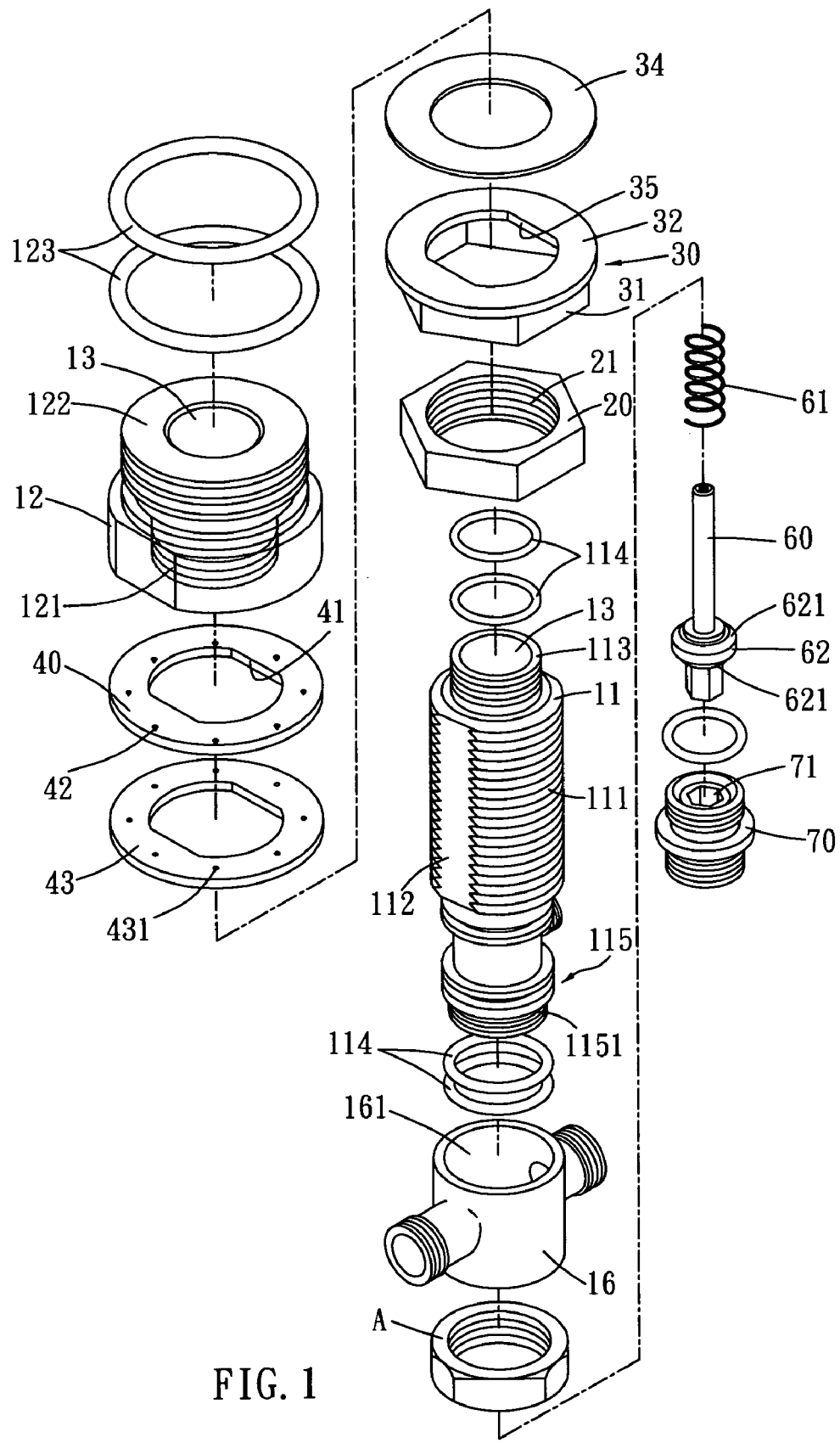
FIG. 1 is an exploded perspective view of a faucet with a water outlet controlled by a central pull stick of the present invention.
Figure 2:
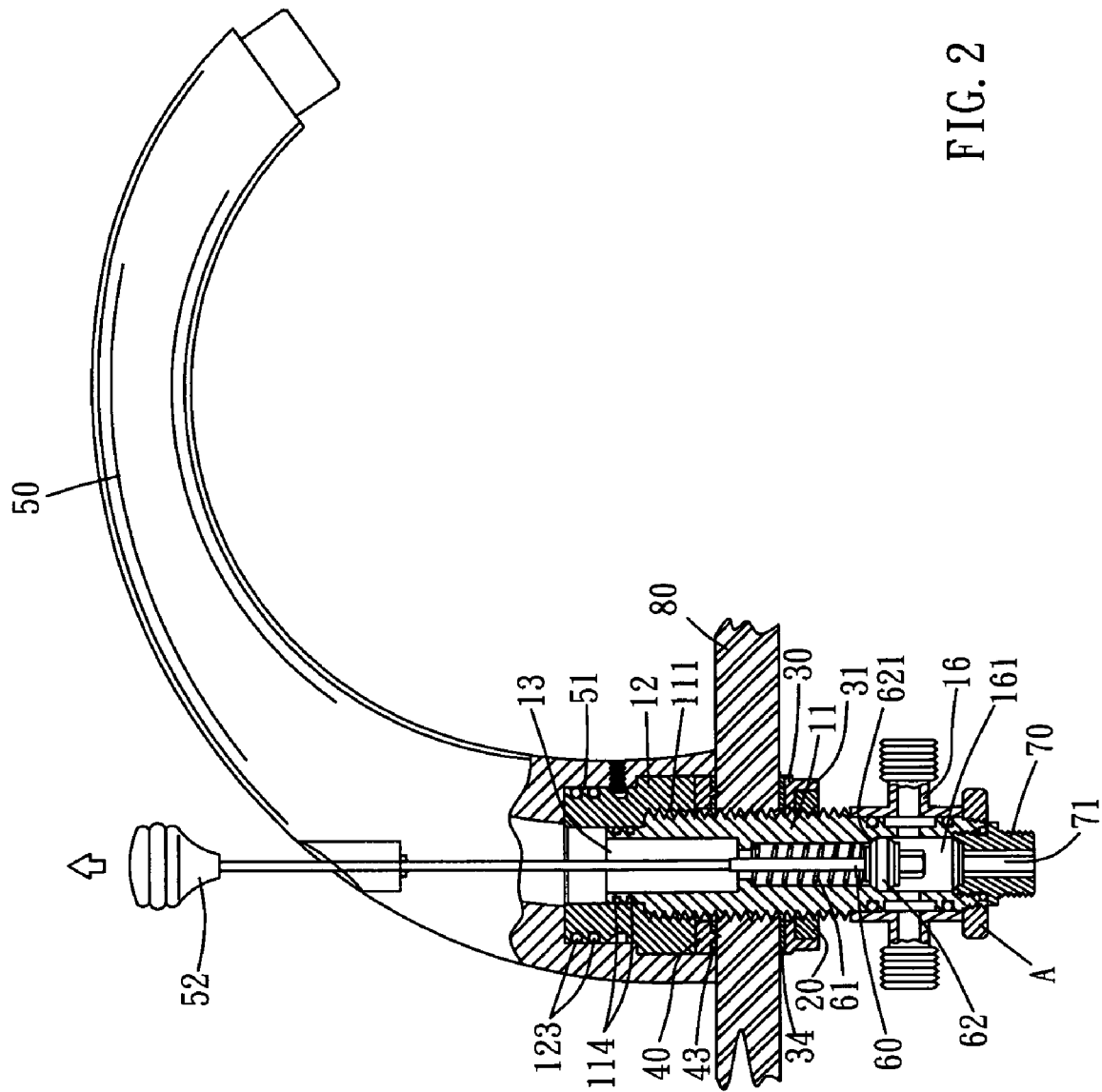
FIG. 2 is a side cross-sectional view of the faucet with a water outlet controlled by a central pull stick in FIG. 1 wherein the pull stick is lifted.
Figure 3:
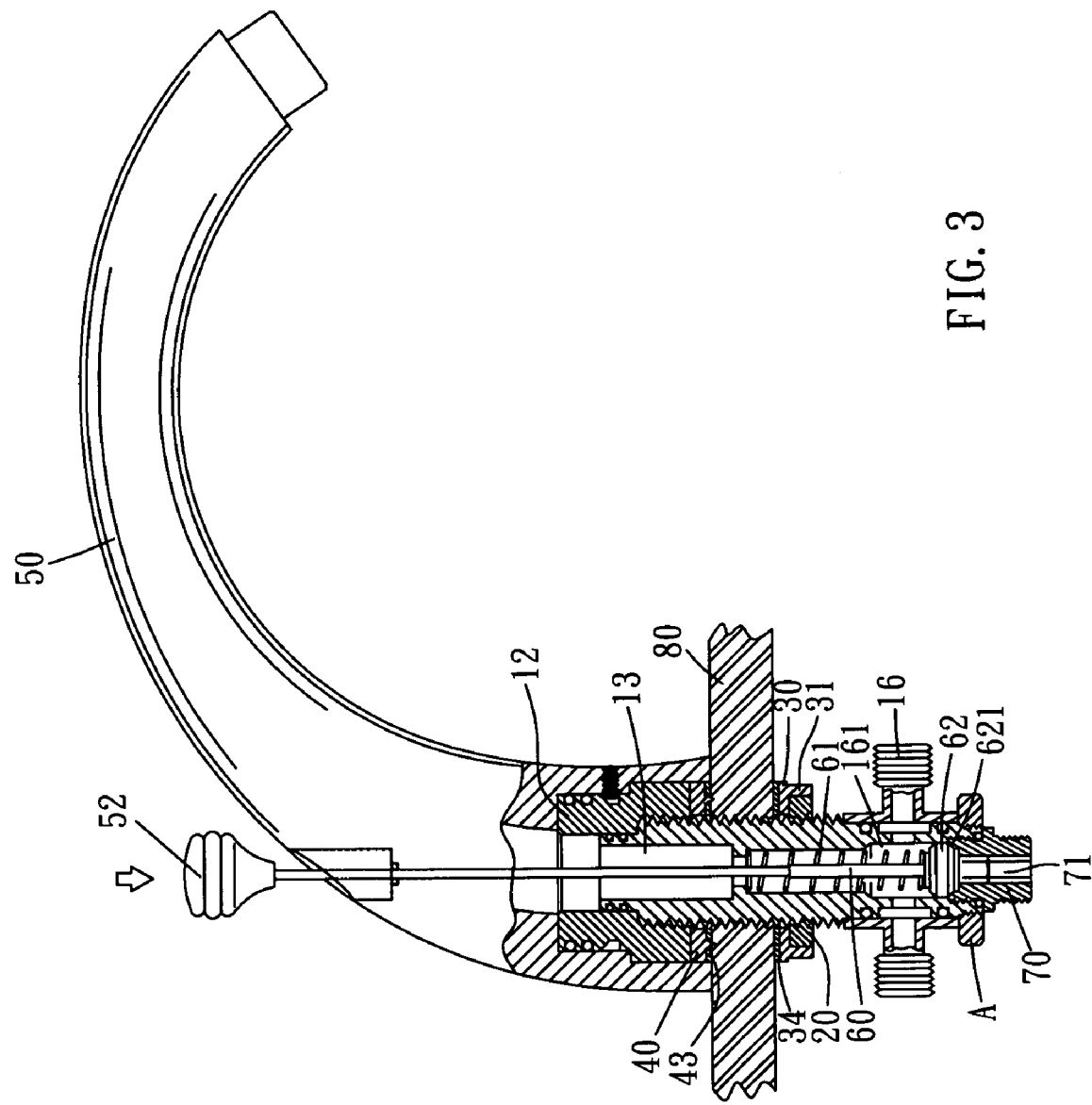
FIG. 3 is a side cross-sectional view of the faucet with a water outlet controlled by a central pull stick in FIG. 1 wherein the pull stick is pressed down.
Figure 4:
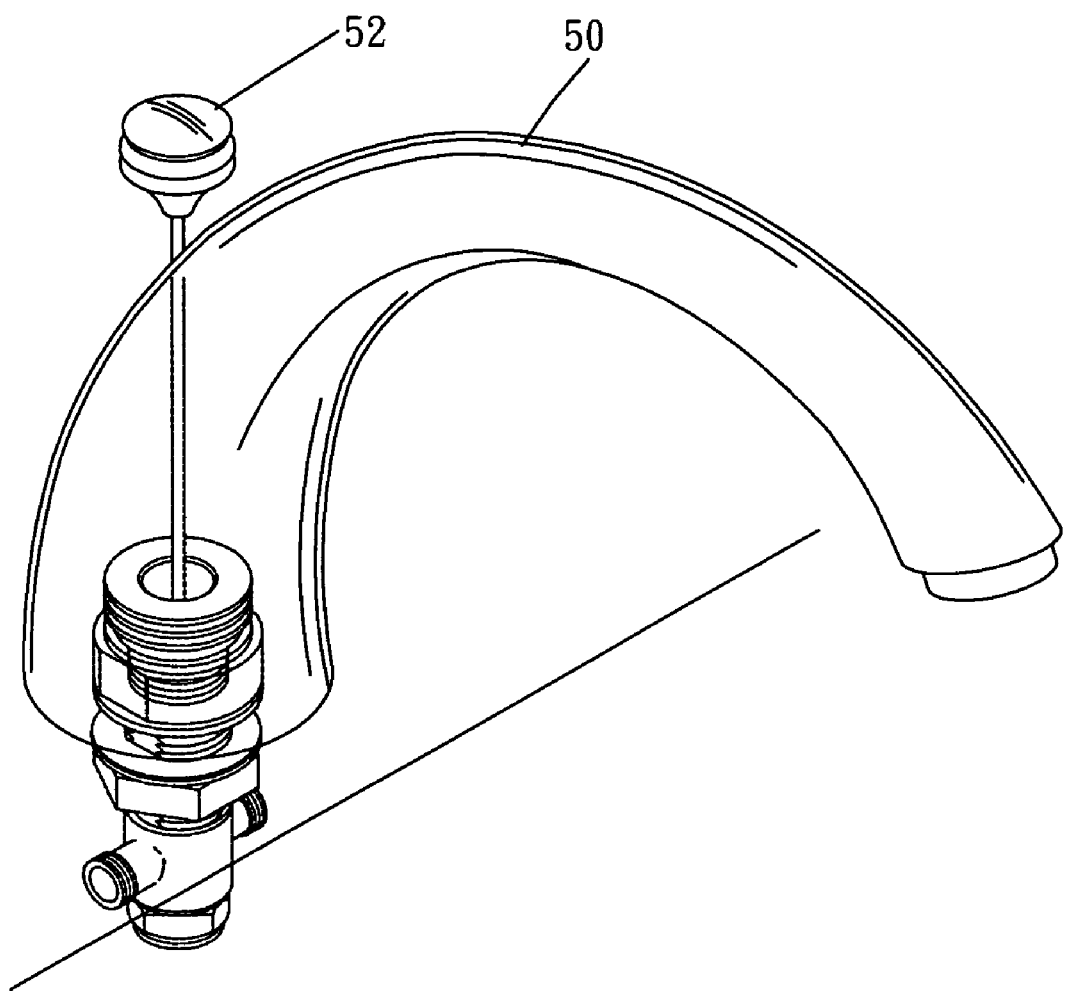
FIG. 4 is a perceptive view of the faucet with a water outlet controlled by a central pull stick in FIG. 1 being installed on one side of a bath tub.
Figure 5:
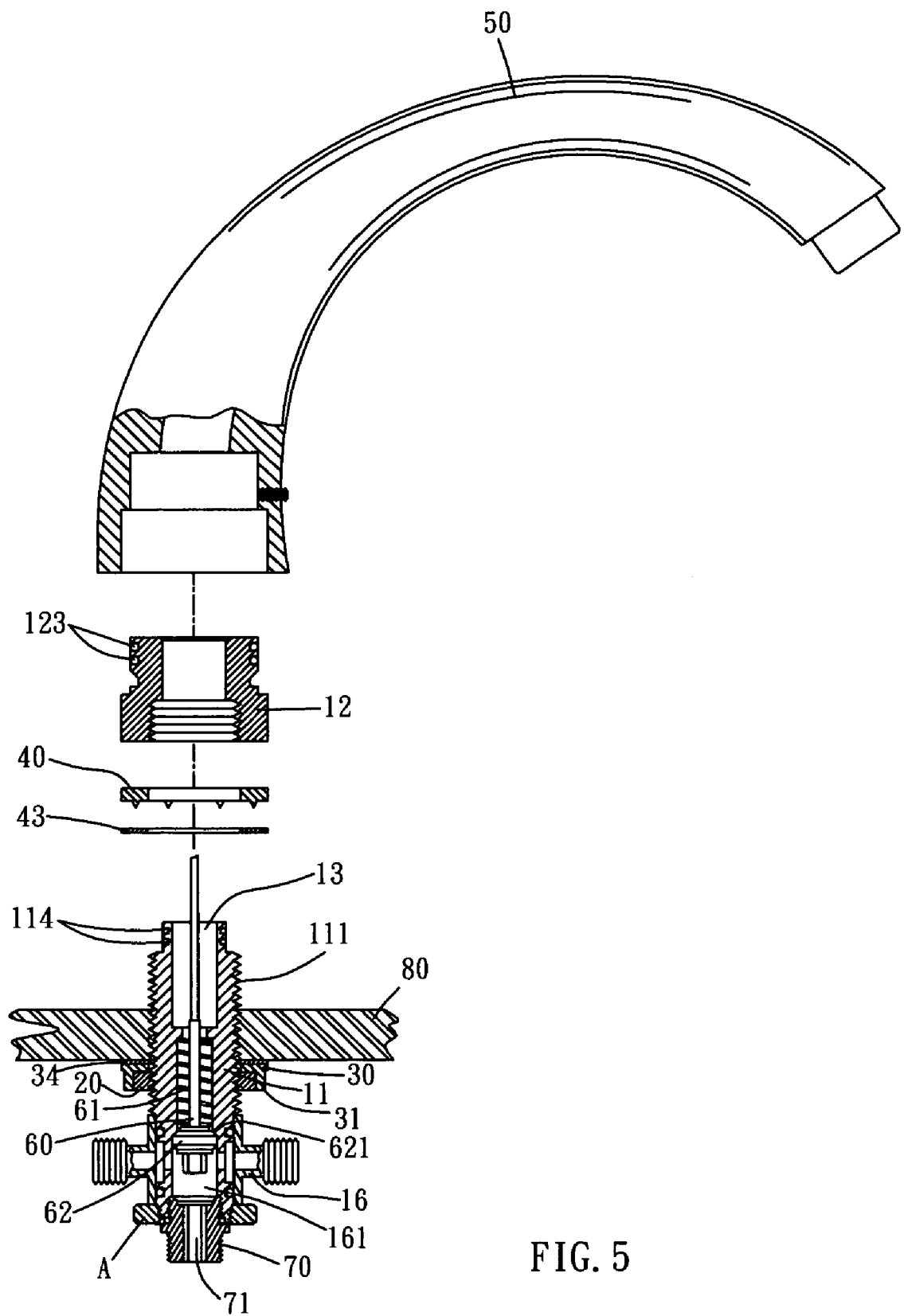
FIG. 5 is a side exploded view of the faucet with a water outlet controlled by a central pull stick in FIG. 1.
Figure 6:
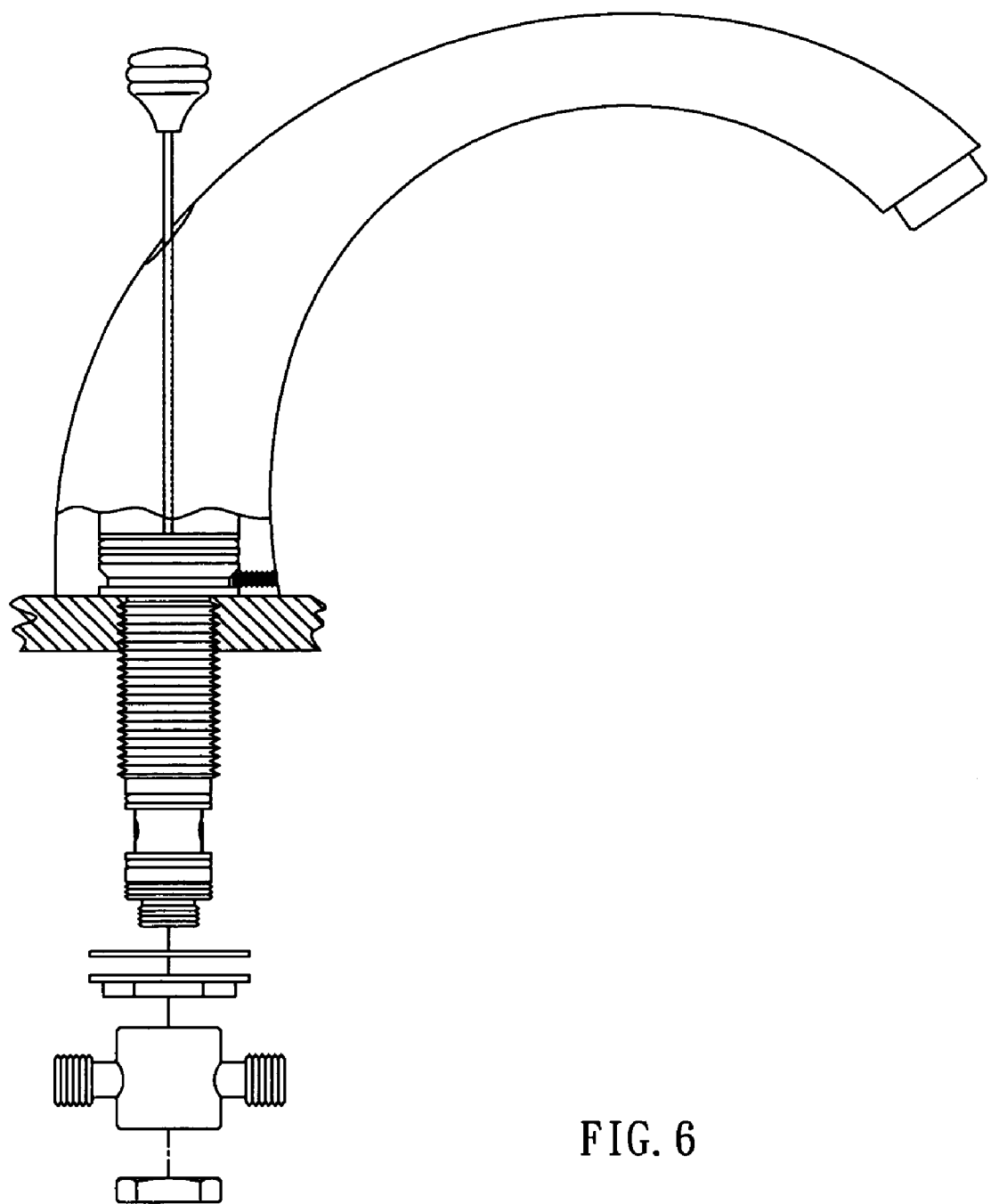
FIG. 6 is a side cross-sectional view of a faucet of the prior art.

Referring to FIGS. 1 to 4, a faucet with a water outlet controlled by a central pull stick according to the present invention comprises a valve body, a water outlet and a water divider. The valve body further comprises a main body 11 and a head portion 12 connected to the top end of the main body 11 by a screwing mechanism. The valve body thus includes a central axial hole 13.

The main body 11 for penetrating an attached material, such as a bath tub and a toilet basin, further comprises an outer thread 111 on the lateral wall thereon and a pair of lateral retaining faces 112. The top section of the main body 11 is an upper connecting section 113 of smaller diameter, which are provided with two O-rings 114. The outer rim of the O-ring 114 blocks on the inner rim of the axial hole in the head portion 12. The lower connecting section 115 of the main body 11 is connected with a multi-way tube 16, which has a vertical hole 161 coaxially connected to the axial hole with in the head portion 12 and is provided with a O-ring 114 attached on the lower connecting section 115. The outer screw thread 1151 of the lower connecting section 115 retains a locking element A. The multi-way tube 16 goes through a vertical axial hole 161 therein and then connected horizontally toward two sides respectively to a cold and a hot water sources.

The axial hole of the head portion 12 has a lower section provided with an inner thread 121 for engaging the outer thread of the main body 11. Its upper section has smooth inner wall, whereby by the O-ring 114 around the upper connecting section 113 of the main body 11 can seal between the coupled head portion 12 and the main body 11. The top connecting section 122 of the head portion 12 further includes two O-rings 123.

The main body 11 further includes a clipping part 20 of hexagonal outer surface with an inner thread 21 that is rotationally attached around the main body 11.

The retaining flange 30 is a T-shaped component coupled with the main body 11 has a covering part 31 for sitting the clipping part 20. The top end of the retaining flange 30 is an expanded support ring 32 to be attached on the lower surface of the attached material. Further, there is a anti-leakage gasket 34 between the support ring 32 and the lower surface of the attached material 80. The inner rim of the retaining flange 30 has a plurality of inner retaining faces 35 for engaging the retaining face 112 of the main body 11, preventing dummy rotation between the retaining flange 30 and the main body.

The retaining disk 40 is sandwiched between the upper surface of the attached material and the head portion 12, which has inner retaining faces 41 formed on an inner rim thereof for engaging the retaining face 112, where relative rotation between the head portion 12 and the retaining disk 40 can be prevented. The lower surface of the retaining disk 40 is provided with a plurality of bulged engagement pieces 42 To prevent water leakage, an anti-leakage gasket 43 is provided between the retaining disk 40 and the upper surface of the attached material.

The water outlet 50 is mounted on to the top end of the head portion 12 of the valve body 13. It has a steeped inner hole 51 connected with an axial hole 13 within the valve body 11. The central section of the water outlet 50 is provided with a vertical pull stick 52.

The water divider 60 is coaxially housed in the axial hole within the valve body 11. It further includes a resilient element 61. The water divider 60 further comprises an water existing valve tube 70 and is coupled with the pull stick 52 axially going through the water outlet 50, whereby an upward/downward motion of the pull stick 52 will activate opening/closing of both of the axial hole 13 within the valve body 11 and a vertical axial hole of the multi-way tube 16, and whereby the direction of an inward water flow will be selected.

Accordingly, the present invention has the following advantages.

1. Because the main body 11 and the head portion 12 are separate parts, mounting the present invention onto an attached material (such as a bath tub and a toilet basin) can be easily done.

2. Because the valve body and the water exiting valve tube 70 of smaller diameter are also separated parts connected by screwing, the water divider 60 can be firstly inserted into the bottom axial hole 13 of the main body 11, and then the exiting valve tube 70 is linked. Special tools for mounting the water divider 60 are not necessary, saving much work time.

3. The valve body, consisting of the retaining flange 30, the clipping part 20, the water divider 60, the multi-way tube 16 and the locking element A can be assembled firstly. The installation of the faucet can be done, by adjusting the height of the clipping part 20, inserting the valve body 11 below the attached material and then assemble the retaining disk 40 and the head portion 12. Finally, the water outlet 50 is attached with the main body 11. Therefore, the procedures of installation are much simplified.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A faucet with a water outlet controlled by a central pull stick, comprising:
    a valve body having a main body and a head portion connected to a top end of said main body by a screwing mechanism, said main body for penetrating an attached material further comprising a threaded outer wall that at least includes a lateral retaining face, a clipping part and a retaining flange housing said clipping part underneath, a top surface of said retaining flange being further provided with a support ring supporting against a bottom surface of said attached material, an inner rim around said retaining flange being further provided with a plurality of inner retaining faces, said main body further comprising a bottom multi-way tube;
    a water outlet mounted on to a top end of said head portion of said valve body having a water exit part connected with an axial hole within said valve body; and
    a water divider coaxially housed in said axial hole within said valve body further including a resilient element, said water divider further comprising a valve tube and being coupled with a pull stick axially going through said water outlet, whereby an upward/downward motion of said pull stick will activate an opening/closing of both of said axial hole within said valve body and a vertical axial hole of said multi-way tube, and whereby the direction of an inward water flow will be selected.

2. The faucet with a water outlet controlled by a central pull stick of claim 1 wherein between said support ring of said retaining flange and said bottom surface of said attached material there is a anti-leakage gasket.

3. The faucet with a water outlet controlled by a central pull stick of claim 1 wherein between said head portion of said valve body and said top surface of said attached material there is a retaining disk having at least an inner retaining face engaged with said retaining face on said man body.

4. The faucet with a water outlet controlled by a central pull stick of claim 3 wherein between said retaining disk and said top surface of said attached material there in a anti-leakage gasket.

5. The faucet with a water outlet controlled by a central pull stick of claim 3 wherein said retaining disk further including a plurality if bottom bulged engagement pieces for enhancing an engagement with said attached material.

6. The faucet with a water outlet controlled by a central pull stick of claim 1 wherein said retaining face on said man body and said inner retaining face of said retaining disk are cut faces opposing each other.

7. The faucet with a water outlet controlled by a central pull stick of claim 1 wherein said multi-way tube has two horizontal ends, respectively connected to a cold-water handle and a hot-water handle, and a vertical lower end connected to a show head through a flexible tube.

* * * * *